United States Patent
Ren (10) Patent No.: US 10,271,342 B2
(45) Date of Patent: Apr. 23, 2019

(54) ALLOCATING FEEDBACK RESOURCES FOR CARRIER AGGREGATION

(71) Applicant: TELEFONAKTIEBOLAGET L M ERICSSON, Stockholm (SE)

(72) Inventor: Hong Ren, Ontario (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 314 days.

(21) Appl. No.: 13/961,409

(22) Filed: Aug. 7, 2013

(65) Prior Publication Data

US 2015/0043433 A1 Feb. 12, 2015

(51) Int. Cl.
*H04W 72/10* (2009.01)
*H04L 1/18* (2006.01)
*H04L 5/00* (2006.01)

(52) U.S. Cl.
CPC .......... *H04W 72/10* (2013.01); *H04L 1/1854* (2013.01); *H04L 1/1861* (2013.01); *H04L 5/001* (2013.01); *H04L 5/0055* (2013.01)

(58) Field of Classification Search
USPC ............. 370/252, 329; 455/450, 452.1
See application file for complete search history.

(56) References Cited

U.S. PATENT DOCUMENTS

| 8,780,815 | B2* | 7/2014 | Suga | H04W 72/10 370/329 |
| 2009/0290549 | A1* | 11/2009 | Tiirola | H04L 5/0053 370/329 |
| 2010/0091724 | A1* | 4/2010 | Ishii | H04W 52/32 370/329 |
| 2010/0128614 | A1* | 5/2010 | Kuusela | H04L 12/5695 370/252 |

(Continued)

FOREIGN PATENT DOCUMENTS

| CN | 103229580A * | 7/2013 | ............ H04W |
| EP | 2244514A1 | 10/2010 | |

(Continued)

OTHER PUBLICATIONS

3rd Generation Partnership Project, 3GPP TS 36.213 V11.3.0 (3rd Generation Partnership Project; Technical Specification Group Radio Access Network; Evolved Universal Terrestrial Radio Access (E-UTRA); Physical layer procedures (Release 11)), pp. 1-176.*

(Continued)

*Primary Examiner* — Hanh N Nguyen
*Assistant Examiner* — Jose L Perez
(74) *Attorney, Agent, or Firm* — Coats & Bennett, PLLC (57) ABSTRACT

Methods and apparatus are disclosed for allocating PUCCH resources for HARQ feedback so as to minimize the total number PUCCH resources that are allocated while avoiding resource collision. A base station in an uplink Pcell allocates resource sets for use by a plurality of user terminals for providing HARQ feedback to support downlink transmissions to the user terminals in the same transmission time interval. The base station configures a resource group for each user terminal. Each resource group comprises a predetermined number of the allocated resource sets. The base station sorts the user terminals in the order of priority from highest to lowest and selects, in order of priority, a resource set for each user terminal from its configured resource group. To select resources for the user terminal, the base station calculates a weight for each resource set available to the user terminal, and allocate an available resource set with minimum weight to the user terminal.

22 Claims, 6 Drawing Sheets

(56) References Cited

U.S. PATENT DOCUMENTS

| | | | |
|---|---|---|---|
| 2011/0170499 A1 | 6/2011 | Nayeb Nazar et al. | |
| 2011/0223956 A1* | 9/2011 | Villion | H04W 72/042 |
| | | | 455/513 |
| 2011/0249578 A1* | 10/2011 | Nayeb Nazar | H04L 1/0027 |
| | | | 370/252 |
| 2012/0057547 A1* | 3/2012 | Lohr | H04L 5/0007 |
| | | | 370/329 |
| 2012/0182914 A1 | 7/2012 | Hariharan et al. | |
| 2013/0188564 A1* | 7/2013 | Yu | H04W 72/1247 |
| | | | 370/329 |
| 2013/0215759 A1 | 8/2013 | Wang et al. | |
| 2013/0294371 A1* | 11/2013 | Ishii | H04L 1/0003 |
| | | | 370/329 |
| 2014/0036810 A1* | 2/2014 | Harrison | H04W 72/042 |
| | | | 370/329 |
| 2014/0334419 A1* | 11/2014 | Yang | H04L 1/1861 |
| | | | 370/329 |
| 2016/0119926 A1* | 4/2016 | Sahara | H04L 1/0003 |
| | | | 370/329 |

FOREIGN PATENT DOCUMENTS

| | | | | |
|---|---|---|---|---|
| WO | 2012040900 A1 | 4/2012 | | |
| WO | 2012043202 A1 | 4/2012 | | |
| WO | WO 201212291 A1 * | 9/2012 | ........... | H04L 5/0037 |
| WO | WO-2012122917 A1 * | 9/2012 | ........... | H04L 5/0037 |
| WO | WO 2012122917 A1 * | 9/2012 | ........... | H04L 5/0037 |
| WO | WO 2013026403 A1 * | 2/2013 | ........... | H04W 72/10 |
| WO | WO-2013026403 A1 * | 2/2013 | ........... | H04W 72/10 |

OTHER PUBLICATIONS

3rd Generation Partnership Project, 3GPP TS 36.213 VI 1.3.0 (3rd Generation Partnership Project; Technical Specification Group Radio Access Network; Evolved Universal Terrestrial Radio Access (E-UTRA); Physical layer procedures (Release 11)), pp. 1-176.*

Entries for "allocate", "support", and "number", Dictionary.com, at dictionary.reference.com, whole document.*

Entry for "allocate", Federal Standard 1037C, at www.its.bldrdoc.gov/fs-1037/fs-1037c.htm, whole document.* www.dictionary.com, entry for "calculate", p. 1.*

3rd Generation Partnership Project, "3rd Generation Partnership Project; Technical Specification Group Radio Access Network; Evolved Universal Terrestrial Radio Access (E-UTRA); Physical layer Procedures (Release 11)", 3GPP TS 36.213 V11.3.0, Jun. 24, 2013, pp. 1-176, 3GPP, France, XP050692859.

* cited by examiner

ALLOCATING FEEDBACK RESOURCES FOR CARRIER AGGREGATION

TECHNICAL FIELD

The invention relates generally to resource allocation in wireless communication networks and, more particularly, to allocation of feedback resources in a communication network with carrier aggregation to reduce resource collision.

BACKGROUND

Carrier aggregation (CA) is a feature in the Long Term Evolution (LTE) standard that allows user terminals to transmit and receive on multiple carriers simultaneously. Carrier aggregation enables operators to use their spectrum more efficiently and increase user data rate and/or throughput. For downlink transmissions in LTE, user data can be transmitted to a user terminal on multiple carriers in the same transmission time interval (TTI), which is 1 ms. Similarly, for uplink transmissions, a user terminal can transmit on multiple carriers simultaneously. Each cell on a given carrier is a serving cell to the user terminal. Each user terminal has only one downlink primary cell (Pcell in short) and one uplink Pcell, but it can have multiple downlink and uplink secondary cells (Scells in short). The Pcells and Scells are user terminal specific, i.e., different user terminals can have different Pcells and Scells. For a user terminal, the Physical Uplink Control Channel (PUCCH) is always associated with the uplink Pcell.

When two downlink serving cells are configured for a user terminal, i.e., one downlink Pcell and one downlink Scell, the user terminal may receive data transmissions on the Physical Downlink Shared Channel (PDSCH) from two downlink serving cells in the same TTI. In this case, the user terminal needs to send Hybrid Automatic Repeat Request (HARQ) feedback to acknowledge transmissions from two serving cells. For carrier aggregation with two downlink cells, up to four transport blocks (TBs) can be transmitted to a user terminal in one TTI (two TBs per carrier). Accordingly, four HARQ feedback bits are needed to acknowledge four TBs.

In LTE, the HARQ feedback can be transmitted on the PUCCH using format 1b with channel selection for two downlink serving cells (one Pcell and one Scell) without cross-carrier scheduling, which allows feedback for up to four TBs. Format 1b is defined in the Third Generation Partnership Project (3GPP) specification TS36.211. In format 1b with channel selection, the HARQ feedback depends not only on the transmitted signal, but also on the PUCCH resource on which the signal is transmitted. To support downlink transmission from two downlink serving cells in transmission modes that support up to two transport blocks, four HARQ resources are needed. Two of the four required HARQ resources are determined based on the index of the first control channel element (CCE) used to transmit the downlink assignment on the Pcell. The other two HARQ resources are selected from among eight resources configured for the user terminal when the downlink Scell is added to the user terminal. The eight resources are divided into four resource sets, each with two resources. Two bits in the downlink assignment for the Scell are used to indicate which resource set among the four configured resource sets should be used to transmit HARQ feedback. Although a user terminal has four HARQ feedback resources, it uses only one resource at one time. The actual HARQ feedback information is carried by not only the signal it transmits, but also the resource it uses. The mapping between the transmitted signal and HARQ feedback resource to HARQ feedback information is specified in the Third Generation Partnership Project (3GPP) specification TS36.213.

The resource allocation approach used in the prior art is sufficient to provide HARQ feedback without resource collision for a maximum of four downlink Scell transmissions per TTI for user terminals with the same uplink Pcell. However, as the number of CA capable user terminals increases, there will be a need to support more than four downlink Scell transmissions per TTI. Additional PUCCH resources have to be added to support more downlink Scell transmissions without resource collision. However, allocating additional resources for HARQ feedback reduces the resources available for transmitting user data.

Thus, there is a need for improved resource allocation methods that minimize the amount of PUCCH resources needed to support more than four Scell transmissions in one TTI for user terminals with the same uplink Pcell while simultaneously maintaining a low probability of resource collision.

SUMMARY

The present disclosure provides methods for allocating PUCCH resources for HARQ feedback so as to minimize the total number PUCCH resources that are allocated while reducing resource collision. Reducing the number of PUCCH resources for HARQ feedback means that more resources are available for user traffic and spectral efficiency is increased. Although the techniques are described in the context of HARQ feedback, the techniques are also applicable to other types of resource allocation.

Exemplary embodiments of the disclosure comprise methods of resource allocation implemented by a base station in a uplink primary cell. In one embodiment of the method, the base station allocates resource sets for use by a plurality of user terminals to feed back information to support downlink transmissions to the user terminals in the same transmission time interval. The base station configures a resource group for each user terminal. Each resource group comprises a predetermined number of the allocated resource sets. The base station sorts the user terminals in order of priority from highest to lowest and selects, in order of priority, a resource set for each user terminal from its configured resource group. To select resources for the user terminal, the base station calculates a weight for each resource set available to the user terminal, and allocates an available resource set with a minimum weight to the user terminal.

Other embodiments of the disclosure comprise a base station in an uplink primary cell. The base station comprises a transceiver circuit for communicating with user terminals and a processing circuit that performs resource allocation. The processing circuit is configured allocate resource sets for use by a plurality of user terminals to feed back information to support downlink transmissions to the user terminals in the same transmission time interval; to configure a resource group comprising a predetermined number of said resource sets for each user terminal; to sort the user terminals in order of priority from highest to lowest; and to select, in order of priority, a resource set for each user terminal from its configured resource group. The processing circuit selects the resource sets for each user terminal by determining a weight for each resource set available to the user terminal, and allocating the resource set with minimum weight to the user terminal.

DETAILED DESCRIPTION

Figure 1:
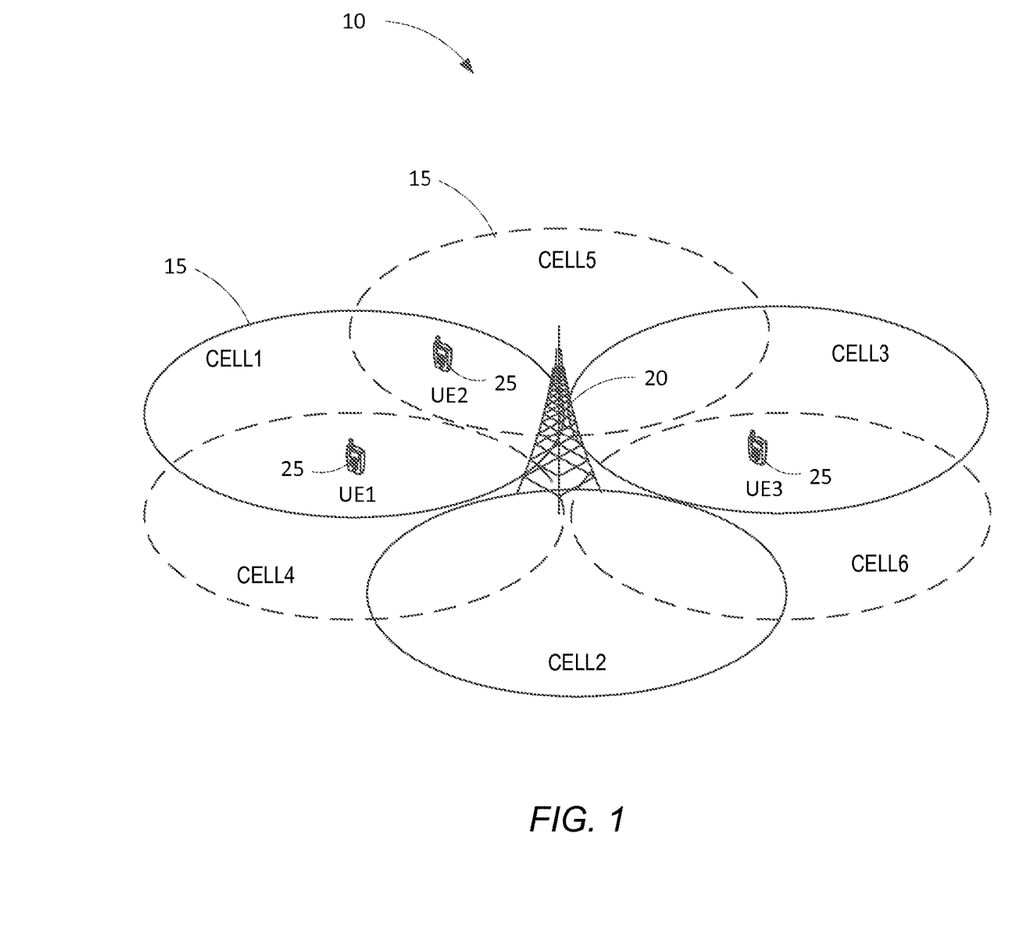
FIG. 1 illustrates a wireless communication network using carrier aggregation.

Referring now to the drawings, FIG. 1 illustrates an exemplary communication network 10 implementing resource allocation techniques to support Hybrid Automatic Repeat Request (HARQ) feedback as hereinafter described. The present disclosure is described in the context of a Long-Term Evolution (LTE) network supporting carrier aggregation (CA), which is specified in Release 10 of the LTE standard. However, those skilled in the art will appreciate that the invention may be applied in communication networks using other communication standards.

The communication network 10 comprises a plurality of base stations 20, known as eNodeBs (eNBs) in the LTE standard, providing radio coverage in respective cells 15 of the communication network 10. Only one base station 20 is shown in FIG. 1. The base station 20 serves three cells on frequency F1, denoted as Cells 1-3, and three cells on frequency F2, denoted as Cells 4-6. The communication network 10 also comprises a plurality of user terminals 25 served by respective cells 15. The term user terminal as used herein is synonymous with the term user equipment (UE) in the LTE standard. The communication network 10 employs carrier aggregation (CA) on the downlink. With carrier aggregation, each user terminal 25 may be served by a Pcell and one or more Scells.

FIG. 1 shows three user terminals 25 denoted respectively as UE1, UE2 and UE3. UE1 and UE2 are served by the same primary cell, denoted as Cell1, but by different secondary cells, denoted as Cell4 and Cell5 respectively. UE3 has Cell6 as its primary cell and Cell3 as its secondary cell. It is assumed in this example scenario that the transmission mode supports the transmission of up to two transport blocks from each cell. Thus, when two downlink serving cells are configured for a user terminal 25, i.e., one downlink Pcell and one downlink Scell, the user terminal 25 needs to transmit four HARQ feedback bits on the PUCCH to the uplink Pcell to acknowledge the reception of four transport blocks (TBs) from two cells.

In LTE, the HARQ feedback can be transmitted on the PUCCH using format 1b with channel selection for two downlink serving cells (one Pcell and one Scell) without cross-carrier scheduling, which allows feedback for up to four transport blocks. To support downlink transmission from two downlink serving cells 15, four HARQ resources are needed. In format 1b with channel selection, two of the four required HARQ resources are determined based on the index of the first control channel element (CCE) used to transmit the downlink assignment on the Pcell. The other two HARQ resources are selected from eight resources configured for the user terminal when the downlink Scell is added to the user terminal. The eight resources are divided into four resource sets, each with two resources. A group of four resource sets is referred to herein as a resource group. Two bits in the downlink assignment for the Scell are used to indicate which resource set among the four configured resource sets should be used to transmit HARQ feedback.

The above scheme is sufficient to provide HARQ feedback without resource collision for a maximum of four downlink Scell transmissions per TTI for user terminals 25 with the same uplink Pcell. As the number of user terminals 25 capable of carrier aggregation increases, there will be a need to support more than four downlink Scell transmissions per TTI. Unless additional resources are allocated, resource collisions will occur.

When resource collisions occur, not all user terminals 25 can be scheduled to receive a downlink Scell transmission in the same TTI. This scenario creates several problems. One serious problem is that user data rate or throughput is impacted. In addition, the lack of PUCCH resources can lead to other resources not being used. For a PDSCH transmission to be actually scheduled, it requires Physical Downlink Control Channel (PDCCH) resources for sending scheduling information to the user terminal 25, Physical Downlink Shared Channel (PDSCH) resource to transmit the user data, and PUCCH resources for HARQ feedback. When these resources are assigned in series, resource collision during the selection of the PUCCH resource for a user terminal 25 may cause other resources allocated to the blocked user terminal 25 to be wasted. For example, if the PUCCH resource is assigned last, for user terminals 25 that do not get PUCCH resources, the PDCCH and PDSCH resources assigned to them would be wasted. It is normally difficult to release the assigned resources and re-assign them to other user terminals 25 due to time constraint. Even if the various resources are assigned in parallel, blocking a user terminal 25 due to collision of one type of resource is still a problem. It may result in other types of resources not being fully utilized. Even if all resources can be fully utilized, it may cause priority inversion. That is, some low priority user terminals 25 may get scheduled before higher priority user terminals 25, which is not desirable. Thus, the probability of a resource collision should be reduced as much as possible.

Figure 2:
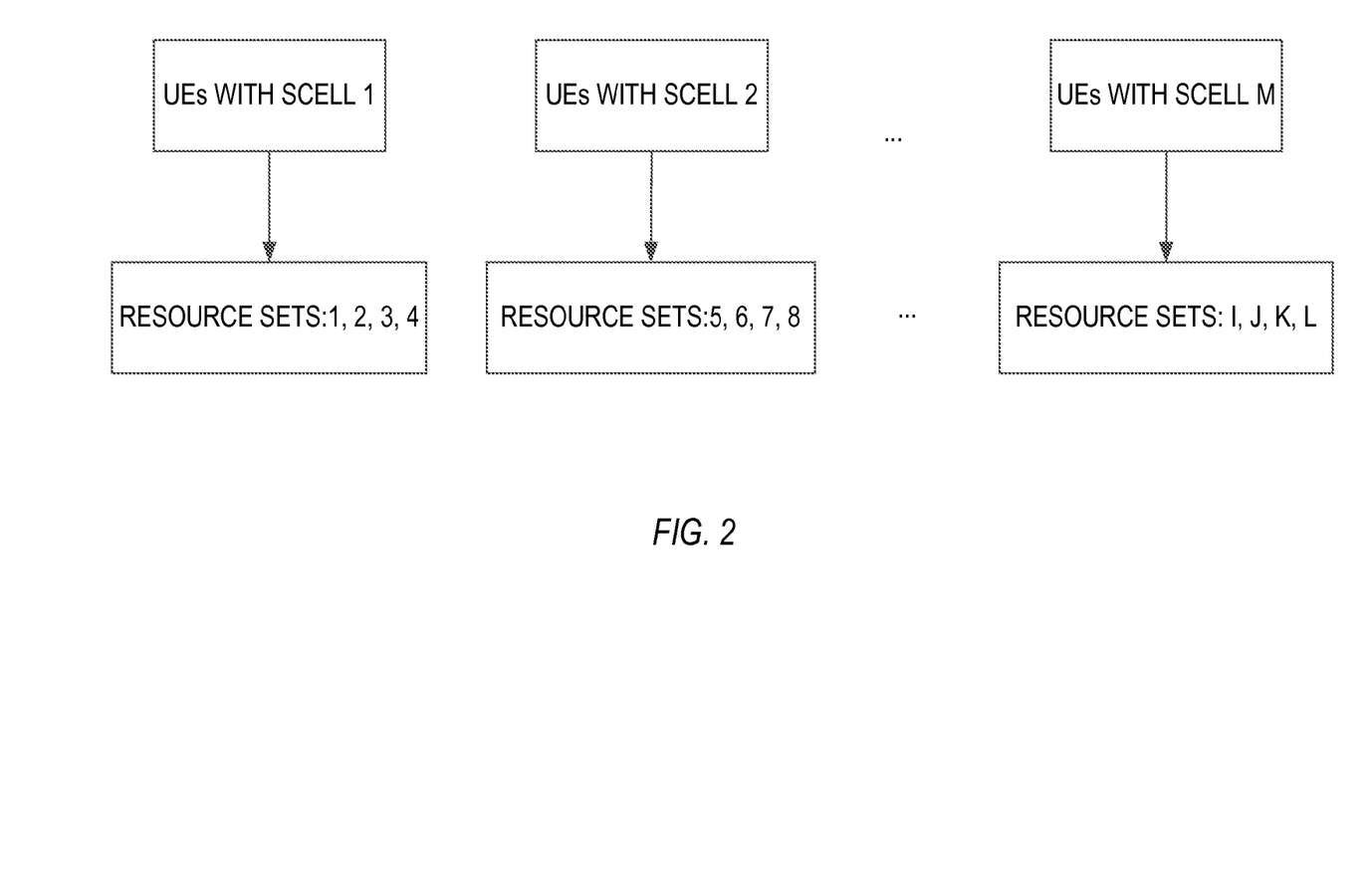
FIG. 2 illustrates a scheme for resource allocation to support HARQ feedback without resource collision.

To support more than four Scell transmission per TTI, additional PUCCH resource sets are needed to avoid resource collision. One simple solution is shown in FIG. 2. User terminals 25 served by the same uplink Pcell are divided into groups and each group is allocated four resource sets. In the example shown in FIG. 2, the user terminals 25 with the same Scell are grouped together. Within each group, there are sufficient PUCCH resources to provide HARQ feedback without resource collision for up to four Scell transmissions per TTI.

However, this simple solution has several drawbacks. First, the total number of allocated resource sets for all user terminals 25 with the same uplink Pcell must be a multiple of four. This approach limits the flexibility of resource allocation. For example, if one Pcell is associated with five Scells, the base station 20 would need to allocate 20 resource sets. This approach tends to allocate more PUCCH resources than what is actually needed and means that less resources are available for uplink data transmission on Physical Uplink Shared Channel (PUSCH). Another drawback is that the allocated resources are likely not utilized efficiently. The numbers of user terminals 25 in each group are different and traffic patterns for different groups of user terminals 25 are different. For a given TTI, the allocated PUCCH resources may not be enough for a big group of user terminals 25 with heavy traffic, while PUCCH resources for a small group of user terminals 25 with light traffic are under-utilized. As a result, spectral efficiency is reduced, which is not desired.

In one embodiment of the present disclosure, a method is provided for allocating PUCCH resources for HARQ feedback so as to minimize the total number PUCCH resources that are allocated while reducing resource collision. Reducing the number of PUCCH resources means that more resources are available for user traffic and spectral efficiency is increased.

Figure 3:
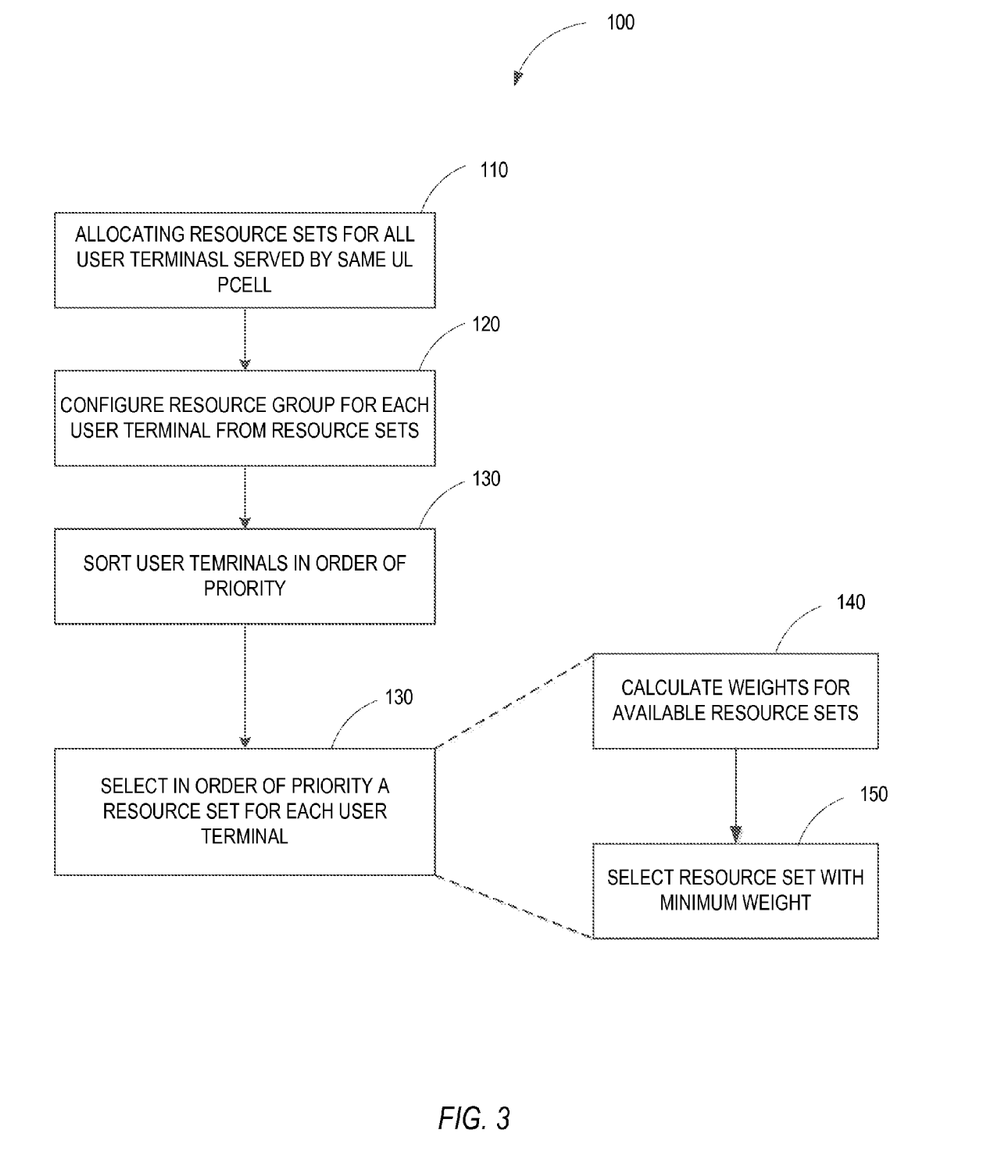
FIG. 3 illustrates an exemplary method of resource allocation to support HARQ feedback.

FIG. 3 illustrates an exemplary method 100 according to one embodiment. The method 100 may be performed by a base station 20 in the uplink Pcell. The base station 20 initially allocates resource sets for use by a plurality of user terminals 25 to feed back information (e.g. HARQ bits) to support downlink transmissions to the user terminals 25 in the same TTI (block 110). The resource allocation is per uplink Pcell. The number of resource sets to be allocated is determined based on the maximum number of downlink Scell transmissions allowed per TTI for user terminals 25 with the same uplink Pcell. In fact, the minimal amount of resource sets allocated should be equal to the maximum allowed number of downlink Scell transmission per TTI. For example, if up to six downlink Scell transmissions are allowed per TTI and they are all associated with the same uplink Pcell, the minimum number of resource sets that should be allocated is six. If the number of resource sets allocated is less than six, it is not possible to allow six downlink Scell transmissions while providing each user terminal 25 with a unique resource set to send HARQ feedback. More resource sets could be allocated, but the trade-off is less resources to carry data traffic. As will be explained in more detail below, if the minimum number of resource sets is allocated, it is important to have good algorithms to configure resource sets for each user terminal 25 with Scell transmissions and to select the right resource set to use in a given TTI.

After allocating resource sets for feedback for the user terminals 25, the base station 20 configures a resource group comprising a predetermined number of resource sets for each user terminal 25 that is expected to receive downlink Scell transmissions in the same TTI (block 120). A resource group is configured for a user terminal 25 when an Scell is added for the user terminal 25.

Given M sets of allocated resources, it is possible to construct many groups of resource sets, with each group containing four resource sets. One way to construct the resource groups is based on mathematical combinations. A combination is a way of selecting several items from a larger group of items. If four resource sets are selected from the allocated resource sets to form a resource group, then the number N of distinct resource groups is given by:

$$N = \frac{M!}{4!(M-4)!}$$

For example, where M=6 and four resource sets are allocated for each resource group, there are 15 distinct resource groups. Assuming that all possible combinations are used, each resource set will be used in the same number of resource groups.

When a downlink Scell is added for a user terminal 25, the user terminal 25 is assigned one of the N resource groups to use for providing HARQ feedback. The assignment of a resource group to the user terminal 25 can be made randomly, or in Round Robin fashion. In any case, it is desirable to assign user terminals 25 to resource groups so as to equalize as much as possible the number of times each resource set is configured for a user terminal 25. If some resource sets are configured for too many user terminals 25, it is easy for some of these user terminals 25 to be blocked. On the other hand, if some resource sets are configured for too few user terminals 25, these resource sets tend to be under-utilized.

Figure 4:
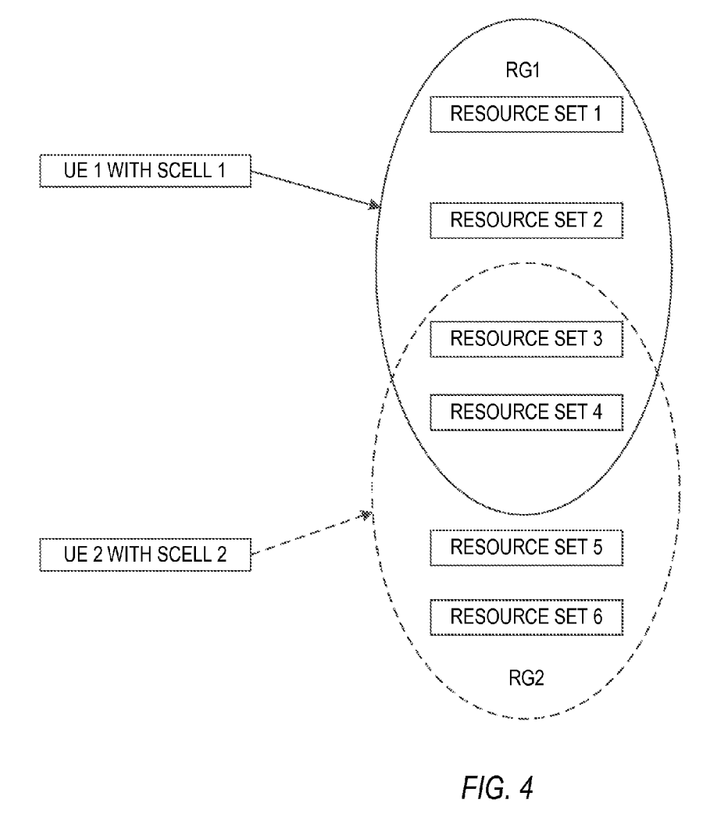
FIG. 4 illustrates a resource allocation to support HARQ feedback for two user terminals.

The configuration processing as herein described allows different resource groups to share the same resource sets. The sharing of resource sets among different groups is illustrated in FIG. 4, where two user terminals 25 denoted as UE1 and UE2 are configured with different resource groups denoted as RG1 and RG2. RG1 includes Resource Sets 1-4, while RG2 includes Resource Sets 3-6. Thus, UE1 and UE2 share resource sets 3 and 4 in their configured resource groups. Compared to the simple solution shown in FIG. 2, the sharing of resource sets among different resource groups will result in better PUCCH resource utilization so that fewer PUCCH resources will need to be allocated.

Because the number of resource sets allocated for all user terminals 25 is minimized, it is almost certain that one or more resource sets will be configured for multiple user terminals 25. When Scell transmissions for multiple user terminals 25 are scheduled in the same TTI, one resource set needs to be selected for each user terminals 25 from its configured resource group. One simple approach is to select the first available resource set for each user terminal 25 from its configured resource group. With this approach, the probability of resource collision will be high.

In the method shown in FIG. 3, the user terminals 25 with the same uplink Pcell are sorted in order of priority from highest to lowest before the selection process begins (block 130). A priority list of the user terminals 25 in sorted order is then stored in memory of the base station 20 serving the uplink Pcell for use during the selection process. Sorting the user terminals 25 prior to the selection process ensures that, in the event of a resource collision, the user terminals 25 with the highest priority will be allocated the contended resource set and prevent priority inversion.

After sorting the user terminals 25, the selection process begins. During the selection process, the base station 20 selects, in order of priority, a resource set for each user terminal 25 from its configured resource group (block 140). The resource selection for each user terminal 25 is made by calculating a weight for each resource set available to the user terminal 25 (block 150), and allocating the resource set with the minimum weight to the user terminal 25 (block 160).

Figure 5:
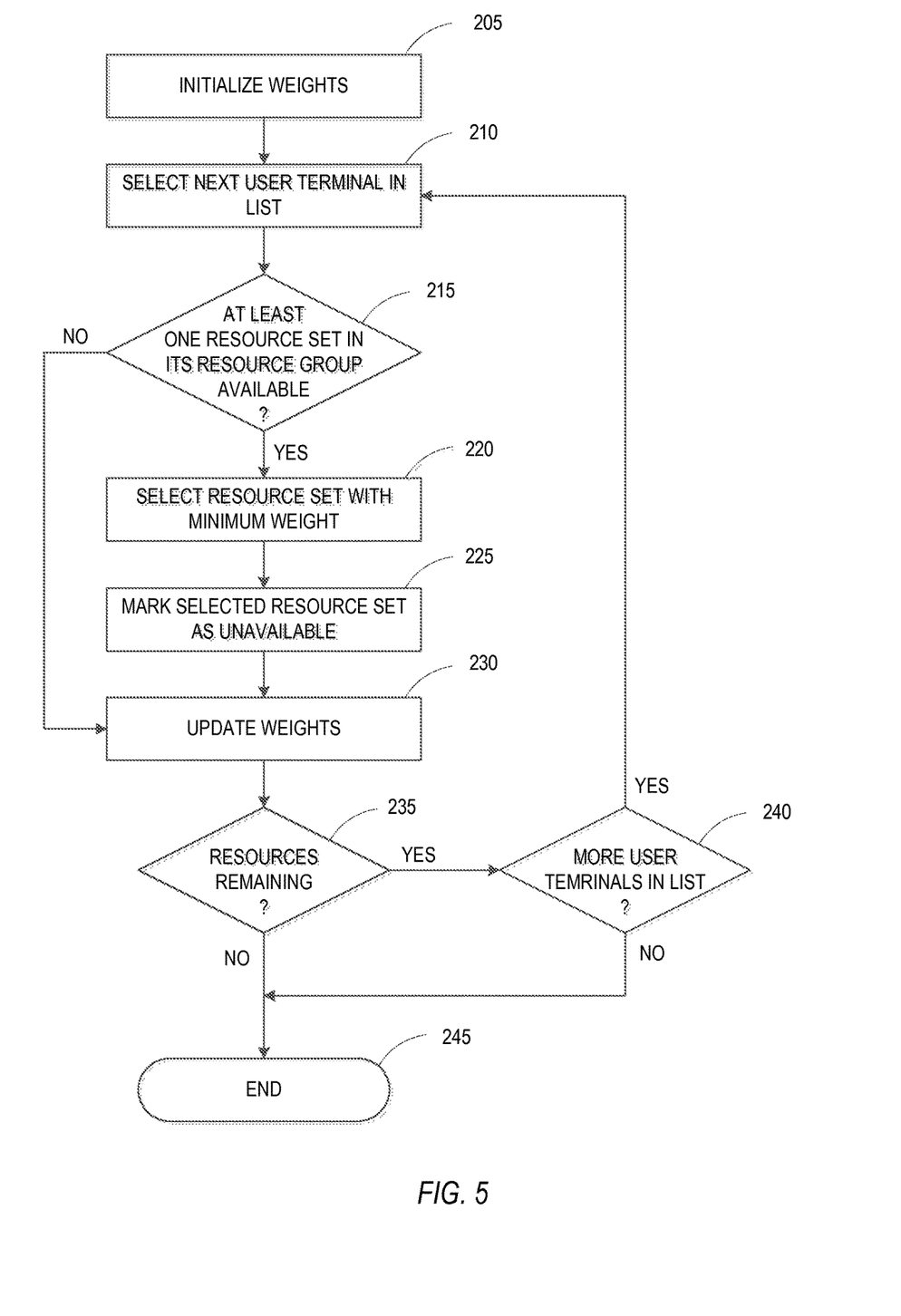
FIG. 5 illustrates a method of resource selection.

FIG. 5 illustrates an exemplary selection process 200 for selecting resource sets for the user terminals 25. To begin the selection process, weights are initialized for each resource set that is configured for at least one of the user terminals 25 (block 205). In one embodiment, the initial weight for each resource set is the number of times that the resource set appears in the configured resource sets for all user terminals 25 that may have Scell transmissions in the same TTI. For example, if a resource set is used in the configured resource groups of four user terminals 25, then its initial weight is four.

After the weights for the resource sets are initialized, the base station 20 selects the first user terminal 25 in the priority list (block 210) and determines whether any resource sets in the configured resource group for the selected user terminal 25 are available (block 215). If so, the base station 20 selects the available resource set with the minimum weight (block 220) and marks the selected resource set as unavailable (block 225). Once a resource set is selected for the user terminal 25, the base station 20 removes the user terminal 25 from the priority list and recalculates the weights for the resource sets configured for the user terminal 25, i.e., subtract 1 from the previous weight for each resource set in the resource group (block 230). The base station 20 then determines whether any resource sets are remaining (block 235). If so the selection process continues by checking whether any user terminals 25 remain in the priority list (block 240). If no resource sets are remaining, or the end of the priority list has been reached, the process ends (block 245). Assuming that more resource sets are available and at least one user terminal 25 remains in the list, the base station 20 selects the next user terminal 25 in the list (block 210) and continues as previously described until the resource sets are exhausted or the end of the priority list is reached.

During the selection process, it is possible for a user terminal 25 to be blocked. When it is determined that no resource sets for a user terminal 25 are available (block 215), the base station 20 removes the user terminal 25 from the priority list and updates the weights as previously described (block 230). The selection process then continues as previously described.

Table 1 below illustrates resource selection using simple selection and weight-based selection as herein described.

TABLE 1

Comparison of Simple Selection vs. Weight-based Selection

| | Configured Resource Sets | Simple Selection | Weight-based Selection |
|---|---|---|---|
| UE1 | RS1, RS2, RS3, RS5 | RS1 | RS1 |
| UE2 | RS2, RS3, RS4, RS5 | RS2 | RS2 |
| UE3 | RS1, RS2, RS3, RS5 | RS3 | RS3 |
| UE4 | RS1, RS2, RS4, RS5 | RS4 | RS5 |
| UE5 | RS1, RS2, RS3, RS4 | No resources | RS4 |

As shown in Table 1, simple resource selection can easily result in a user terminal 25 being blocked due to resource collision even though resources are available. The weight-based approach will usually avoid resource collision.

Figure 6:
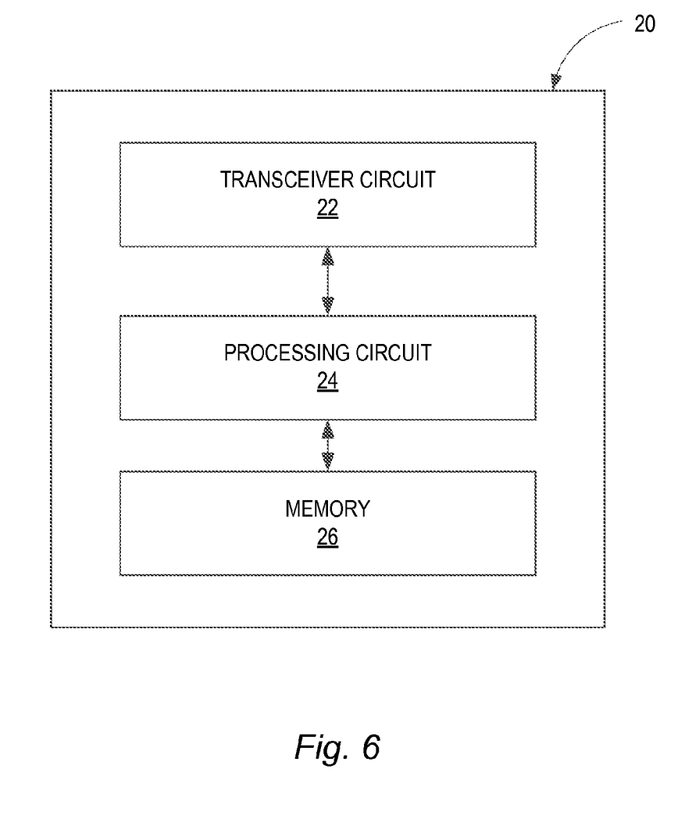
FIG. 6 illustrates an exemplary base station configured to allocate HARQ feedback resources as herein described.

FIG. 6 illustrates the main functional elements of a base station 20 according to one embodiment. Base station 20 comprises a transceiver circuit 22, a processing circuit 24, and memory 26. The transceiver circuit 22 enables the base station 20 to communicate with user terminals 25 over an air interface. The transceiver circuit 22 may be configured to operate according to Release 10 of the LTE standard or other communication standard. The processing circuit 24 processes signals transmitted and received by the base station 20, and provides operational control for the base station 20. The processing circuit 24 may comprise one or more processors, hardware, firmware, or a combination thereof. The processing circuit 24 is configured to implement the methods of resource allocation as herein described and as shown in FIGS. 3 and 5. Memory 26 stores program instructions and data used by the processing circuit 24 for operation. The memory 26 may comprise both Random Access Memory (RAM) and Read-Only Memory (ROM), or other non-transitory computer readable medium. Computer program instructions and data required for operation of base station 20 may be stored in non-volatile memory, such as Erasable Programmable Read Only Memory (EPROM), Electrically Erasable Programmable Read Only Memory (EEPROM), and/or flash memory, which may be implemented as discrete devices, stacked devices, or integrated with one or more processors.

Using the selection process as herein described, it is still possible to have resource collisions. However, the probability of resource collision is significantly reduced. Reducing the probability of resource collision means that fewer resources will be wasted and result in higher throughput. Thus, resource allocation approach as herein described can improve throughput for user terminals capable of carrier aggregation.

What is claimed is:

1. A method implemented by a base station for assigning feedback resources to user terminals in a communication network, said method comprising:
    allocating resource sets for use by the user terminals to feed back information to support multiple downlink transmissions to the user terminals in the same transmission time interval;
    configuring a resource group for each of the user terminals, wherein:
        each resource group comprising at least one of the allocated resource sets; and
        at least one of said resource sets is shared by two or more resource groups;
    sorting the user terminals in an order of priority from highest to lowest;
    selecting, in the order of priority of the user terminals, a resource set in the corresponding resource group configured for the respective user terminal by:
        calculating a weight for each resource set in the corresponding resource group that is available to the respective user terminal, wherein the calculated weight is based on a number of times the resource set is used in the resource groups; and
        assigning, to the respective user terminal, the resource set in the corresponding resource group with minimum weight among the one or more calculated weights; and
    signaling the assigned resource sets to the user terminals.

2. The method of claim 1 wherein the user terminals have the same uplink primary cell.

3. The method of claim 2 wherein the allocating resource sets for use by the user terminals comprises allocating a minimum overall amount of resource sets required to support a maximum number of downlink secondary cell transmissions in a transmission time interval.

4. The method of claim 1 wherein configuring a resource group for each of the user terminals comprises:
    forming a plurality of resource groups from said allocated resource sets; and
    selecting a resource group from among the formed plurality of resource groups for each of the user terminals.

5. The method of claim 4 wherein the forming the plurality of resource groups comprises forming the resource groups such that there is an equal number of resource sets in each of the plurality of resource groups.

6. The method of claim 4 wherein the selecting a resource group from among the formed plurality of resource groups for each of the user terminals comprises selecting a resource group for each user terminal so as to equalize a number of times each of the allocated resource sets is configured for a user terminal.

7. The method of claim 1 further comprising:
maintaining a priority list of the user terminals in sorted order;
marking a resource set as not available when the resource set is assigned; and
removing a user terminal from the priority list when the resource set among the corresponding resource sets configured for the user terminal is assigned to the user terminal.

8. The method of claim 7 further comprising removing the user terminal from the priority list when all resource sets configured for the user terminal are unavailable.

9. The method of claim 1 wherein the calculating comprises calculating that the weight for each resource set is equal to the number of times the resource set appears in the configured resource sets for all user terminals.

10. The method of claim 1 wherein configuring a resource group for each of the user terminals comprises configuring a plurality of resource groups, each of the resource groups comprising a predetermined number of resource sets, to share the resource sets among two or more of the user terminals.

11. A base station comprising:
a transceiver circuit to communicate with user terminals in a communication network;
a processing circuit for assigning feedback resources to the user terminals, said processor circuit being configured to:
 allocate resource sets for use by the user terminals to feed back information to support multiple downlink transmissions to the user terminals in the same transmission time interval;
 configure a resource group for each of the user terminals, wherein:
  each resource group comprising at least one of the allocated resource sets; and
  at least one of said resource sets is shared by two or more resource groups;
 sort the user terminals in an order of priority from highest to lowest;
 select, in the order of priority of the user terminals, a resource set in the corresponding resource group configured for a respective user terminal by:
  calculating a weight for each of the resource sets in the corresponding resource group that is available to the respective user terminal wherein the calculated weight is based on a number of times the resource set is used in the resource groups; and
  assigning, to the respective user terminal, the resource set in the corresponding resource group with minimum weight among the one or more calculated weights; and
 signal the assigned resource sets to the user terminals.

12. The base station of claim 11 wherein all user terminals have the same uplink primary cell.

13. The base station of claim 12 wherein the processing circuit is configured to allocate the resource sets for use by the user terminals by allocating a minimum overall amount of resource sets required to support a maximum number of downlink secondary cell transmissions in a transmission time interval.

14. The base station of claim 11 wherein the processing circuit configures a resource group for each of the user terminals by:
forming a plurality of resource groups from said allocated resource sets; and
selecting a resource group from among the formed plurality of resource groups for each of the user terminals such that each resource group is used by at least one user terminal.

15. The base station of claim 14 wherein the processing circuit is configured to form the plurality of resource groups such that there is an equal number of resource sets in each of the plurality of resource groups.

16. The base station of claim 14 wherein the processing circuit is configured to select a resource group from among the formed plurality of resource groups for each of the user terminals so as to equalize a number of times each of the allocated resource sets is configured for a user terminal.

17. The base station of claim 11 wherein the processing circuit is further configured to:
maintain a priority list of the user terminals in sorted order;
mark a resource set as not available when the resource set is assigned; and
remove a user terminal from the priority list when the resource set among the corresponding resource sets configured for the user terminal is assigned to the user terminal.

18. The base station of claim 17 wherein the processing circuit is further configured to remove the user terminal from the priority list when all resource sets configured for the user terminal are unavailable.

19. The base station of claim 11 wherein the processing circuit is further configured to calculate the weight for each of the resource sets available to the user terminal by calculating the weight for each of the resource sets is equal to the number of times the resource set appears in the configured resource sets for all user terminals in the sorted list.

20. The base station of claim 11 wherein the processing circuit configures a resource group for each of the user terminals by configuring a plurality of resource groups, each of which comprises a predetermined number of resource sets, to share the resource sets among two or more user terminals.

21. A non-transitory computer-readable medium storing executable program instructions for assigning feedback resources to user terminals in a communication network, wherein execution of the program instructions by a base station in a communication network causes the base station to:
allocate resource sets for use by the user terminals to feed back information to support multiple downlink transmissions to the user terminals in the same transmission time interval;
configure a resource group for each of the user terminals, each resource group comprising at least one of the allocated resource sets, wherein at least one of the resource sets is shared by two or more resource groups;
sort the user terminals in an order of priority from highest to lowest;
select, in the order of priority of the user terminals, a resource set in the corresponding resource group configured for a respective user terminal by:
 calculating a weight for each of the resource sets in the corresponding resource group that is available to the respective user terminal, wherein the calculated weight is based on a number of times the resource set is used in the resource groups; and assigning, to the respective user terminal, the resource set in the corresponding resource group with minimum weight among the one or more calculated weights; and signal the assigned resource sets to the user terminals.

22. The method of claim 1, wherein the assigned resource sets comprises resources for sending HARQ feedback.

\* \* \* \* \*